D. KAUFMAN.
Broom.
No. 31,463.
Patented Feb. 19, 1861.
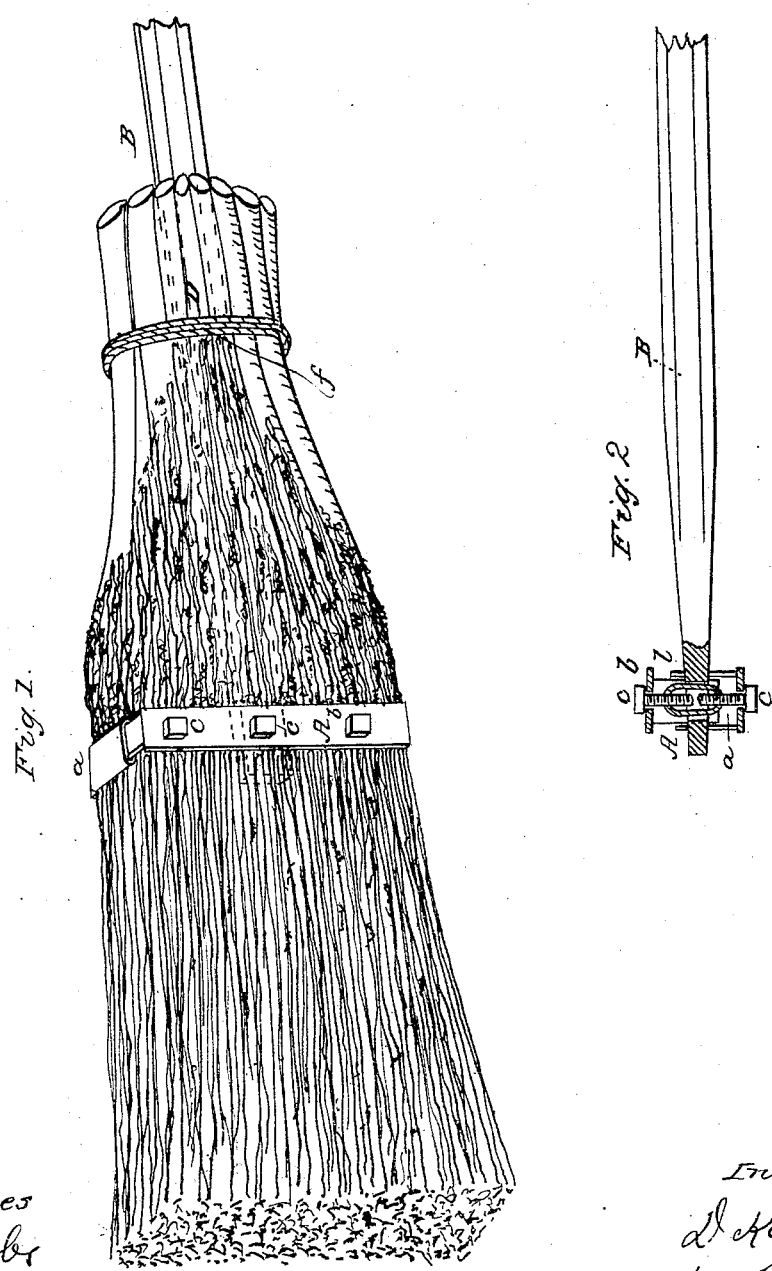

UNITED STATES PATENT OFFICE.

DANIEL KAUFMAN, OF BOILING SPRING, PENNSYLVANIA.

BROOM.

Specification of Letters Patent No. 31,463, dated February 19, 1861.

*To all whom it may concern:*

Be it known that I, D. KAUFMAN, of Boiling Spring, in the county of Cumberland and State of Pennsylvania, have invented a new and Improved Broom; and I do hereby declare that the following is a full, clear, and exact description of the same, reference being had to the accompanying drawing, forming part of this specification, in which—

Figure 1 represents a perspective view of my invention. Fig. 2 is a detached sectional view of the handle.

Similar letters of reference in both views indicate corresponding parts.

This invention consists in the arrangement of clamps consisting of two plates the ends of which are made to slide one in the other, and which are united and fastened to the broom by means of screws, screwing from opposite sides into rings, in combination with a handle the inner end of which is slotted to receive one of said rings in such a manner that by means of said clamps the broom-corn can be fastened to the handle with ease and facility, and that the construction of a corn broom is rendered so simple that almost any person can put one up in a few minutes, and that if a broom is worn out it can easily be replaced by attaching fresh corn to the same handle with the same set of clamps.

The clamp A, which I use for the purpose of securing the broom corn to the handle B, consists of two plates $a$, $b$, the ends of which are turned up at right angles and arranged in such a manner that those of one, slide in those of the other. Between said plates the corn is placed, and the two plates are forced together by means of screws $c$, which screw from opposite sides into oblong rings $d$, as clearly shown in Fig. 2, of the drawing. It is obvious that, instead of three rings, C-shaped hooks or solid blocks might be used. These rings are placed loosely between the plates $a$, $b$, being retained in their respective positions by the corn itself, and by the screws $c$, and one of said rings passes through a slot $e$, in the inner end of the handle B.

The plates $a$, $b$, are secured to the corn at about the middle of its length, and by screwing up the screws $c$, the corn is firmly retained in the desired shape, and at the same time, by passing one of the rings $d$, through the slotted end of the handle B, said handle is prevented from ever getting loose. The butt ends of the corn are fastened to the handle by means of a cord $f$, or in any other desirable manner.

By placing the clamp A, nearer to or farther from the points of the corn the stiffness of the broom can be replaced by taking out the old corn, and putting in a fresh supply, so that the same handle and the same set of clamps can be used for a great number of brooms, and that it requires but little skill and practice to make a broom.

Having thus fully described my invention what I claim as new and desire to secure by Letters Patent, is—

The employment of clamps A, consisting of two plates $a$, $b$, screws $c$, and rings $d$, in combination with the slotted end of a broom-handle B, constructed and operating as and for the purpose herein specified.

DANIEL KAUFMAN.

Witnesses:
R. R. WEBBERT,
J. A. KAUFMAN.